United States Patent [19]

Tatsuki

[11] Patent Number: 5,598,403
[45] Date of Patent: Jan. 28, 1997

[54] PATH SETTING CONTROL SYSTEM IN COMMUNICATION NETWORK

[75] Inventor: Noboru Tatsuki, Tokyo, Japan

[73] Assignee: NEC Corporation, Tokyo, Japan

[21] Appl. No.: 494,565

[22] Filed: Jun. 22, 1995

[30] Foreign Application Priority Data

Jun. 22, 1994 [JP] Japan .................................. 6-139943

[51] Int. Cl.$^6$ ...................................................... H04J 3/14
[52] U.S. Cl. ............................................................ 370/221
[58] Field of Search ............................... 370/16, 60, 16.1, 370/14, 94.1, 94.3; 395/180, 181, 182.01, 182.02; 340/827; 379/220, 221

[56] References Cited

U.S. PATENT DOCUMENTS

| | | | |
|---|---|---|---|
| 4,542,496 | 9/1985 | Takeyama et al. | 370/16.1 |
| 5,031,093 | 7/1991 | Hasegawa | 370/16 |
| 5,241,533 | 8/1993 | Kimoto et al. | 370/16 |

*Primary Examiner*—Douglas W. Olms
*Assistant Examiner*—Ajit Patel
*Attorney, Agent, or Firm*—Sughrue, Mion, Zinn, Macpeak & Seas

[57] ABSTRACT

A path setting control system in a communication network includes terminal nodes located at both ends of a path for data transmission and a plurality of relay nodes located at intermediate positions in the path, and performing alternation process of the path at the occurrence of simultaneous failure in two transmission lines at both sides of one relay node among a plurality of the relay nodes. The path setting control system has a path alternation designating portion in a relay node located at the closest position to the one relay node, for commanding alternation of the path to the terminal node in response to occurrence of failure in the transmission line, a path releasing and alternating portion incorporated in the terminal node, for performing path releasing process and alternating process in response to the alternation command, and a path release designating portion incorporated in the terminal node, for commanding release of the currently set path for the one relay node in response to alternation command for the path transmitted from the one relay node due to failure of one transmission line upon recovery of failure in one of the two faulty transmission lines.

11 Claims, 12 Drawing Sheets

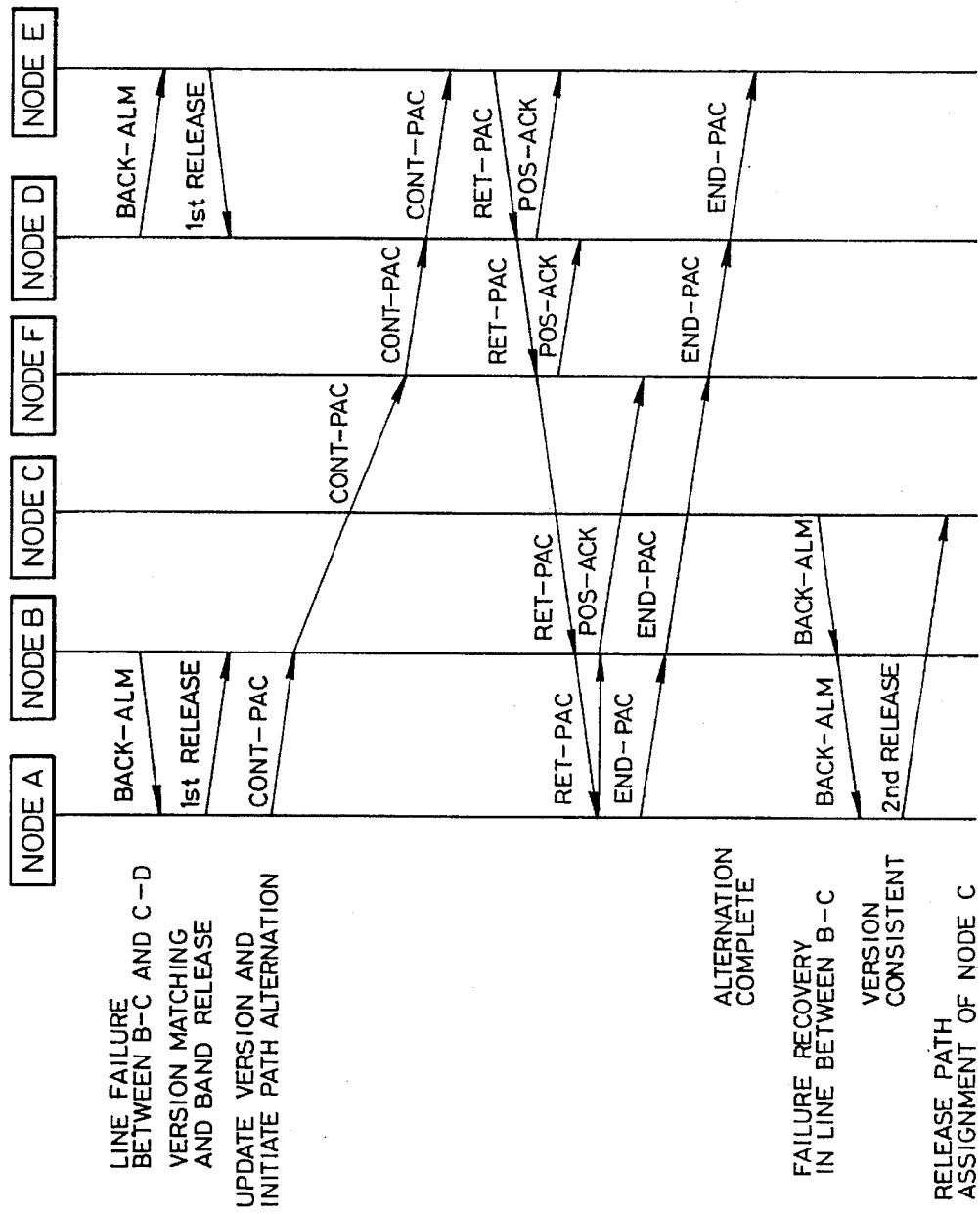

PATH SETTING CONTROL SYSTEM IN COMMUNICATION NETWORK

BACKGROUND OF THE INVENTION

1. Field of the Invention

The present invention relates generally to a path setting control system in a communication network. More specifically, the invention relates to a path setting control system which can recover fault by a distributed self-healing system for faulty network recovery upon occurrence of link failure in a communication network including a plurality of nodes.

2. Description of the Related Art

As one of fault recovery system in a communication network is a distributed self-healing system for faulty network recovery. When failure is caused in a targeted path, alternating operation is performed at both end nodes, at which the path are terminated. Therefore, when the failure is caused at a portion where the terminal node of the path cannot detect directly it becomes necessary to designate alternation of its path to the terminal nodes by the nodes at both ends of the faulty portion.

FIGS. 13(A) to 13(C) are explanatory drawings showing the prior art. In FIGS. 13(A) to 13(C), A, B, C, D, E and F represent nodes. A path 1 is a path set between the nodes A and E. It is assumed that, upon setting the path 1, a path ID which is a path identifying information for identifying the path 1 in the network, and a version identifying number of times of connection of the path are notified to relay nodes B, C and D.

For example, as shown in FIG. 13(A), when failure is caused at two portions of the path between the nodes B and C and between C and D, the nodes B, C and D at faulty ends for alternating the path 1 transmit an alternation designating message 100 for alternating path 1 to the terminal nodes A and E. When the alternation designating message 100 is received, the terminal nodes A and E transmits release message to command release of the path 1 to the relay nodes. The nodes B and D receive the release message and release the path 1. However, since the release message does not reach the node C, the setting of the path 1 is maintained in the node C.

Subsequently, the nodes A and E modify the version of the path 1 and initiate alternation of the path 1. Then, the alternated path is established via the node F, as shown in FIG. 13(B). Then, as shown in FIG. 13(C), when failure is recovered only between the nodes B and C after completion of alternation, since the preceding version of setting is remained in the node C, the node C transmits the alternation designating message 100 is transmitted to the node A for failure between the nodes C and D. Because of difference of version, the node A receiving the alternation designating message from the node C ignores the designation for alternation. Therefore, since alternating operation will not be performed again for the path 1 through which normal communication has already been established, communication through the path 1 may not be interrupted.

However, in such prior art, as shown in FIG. 13(C), despite of the fact that the path 1 has already been alternated through the node F, assignment of the transmission path of the node B and C is maintained in the node C, new path between the nodes B and C cannot be established for lack of band in the transmission path between the nodes B and C. Therefore, efficiency of use of the transmission path can be lowered.

SUMMARY OF THE INVENTION

An object of the present invention is to provide a path setting control system which enables efficient use of transmission paths by permitting releasing of path to be remained without releasing since the path releasing notice does not reach upon alternation of the path.

According to one aspect of the invention, a path setting control system in a communication network including terminal nodes located at both ends of a path for data transmission and a plurality of relay nodes located at intermediate positions in the path, and performing alternation process of the path at the occurrence of simultaneous failure in two transmission lines at both sides of one relay node among a plurality of the relay nodes, the path setting control system comprises:

path alternation designating means included in a relay node located at the closest position to the one relay node, for commanding alternation of the path to the terminal node in response to occurrence of failure in the transmission line; and path releasing and alternating means incorporated in the terminal node, for performing path releasing process and alternating process in response to the alternation command; and path release designating means incorporated in the terminal node, for commanding release of the currently set path for the one relay node in response to alternation command for the path transmitted from the one relay node due to failure of one transmission line upon recovery of failure in one of the two faulty transmission lines.

The one relay node may have a path release means for performing path releasing process in response to the path release command from the terminal node. The terminal node may have path version managing means for managing path version for distinguishing the paths before alternation and after alternation, and the path releasing and alternating means may include process judgement means for performing alternating process of the path according to path version and path releasing command transmission process.

The path version managing means may update path version before alternation of the path after path alternating process, the process judgement means responsive to the path alternation command, check consistency of path version provided for the command and path version after updating, perform path alternation process if consistent and perform path releasing command transmission process otherwise. The network may be a communication network transmitting a packet data, and path alternation commanding and path releasing commanding are performed by a commanding packet. The commanding packet may contain a path identifying information for identifying the transmission path of the packet and a path version information.

According to another aspect of the invention, a path setting control system in a communication network including terminal nodes located at both ends of a path for data transmission and a plurality of relay nodes located at intermediate positions in the path, and performing alternation process of the path at the occurrence of simultaneous failure in two transmission lines at both sides of one relay node among a plurality of the relay nodes, wherein the terminal node is designed to perform path reléase command transmitting process response to alternation command for the path transmitted from the relay node due to failure of transmission line upon recovery of failure in the faulty transmission lines.

The terminal node may include management means for managing path version for distinguishing the path before alternation and the path after alternation, and process judgement means for checking alternation process and release command transmitting portion based on the path version.

The managing means may update path version of the path before alternation after alternation of the path, the process judgement means may check consistency of the path version added to the alternation command after path alternation process and path version after updating for performing the alternation process if consistent and the path releasing command transmission otherwise. The relay node receiving the path releasing command may perform path releasing process.

The network may be a communication network transmitting packet data, the alternation commanding and path release designation may be transmitted by each commanding packet, and the commanding packet contains a path identifying information for identifying the transmission path of the packet and a path version information.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 12 is an illustration showing a sequence of operation of the path setting control system according to the invention.

DESCRIPTION OF THE PREFERRED EMBODIMENT

The present invention will be discussed in detail in terms of the preferred embodiment with reference to the accompanying drawings of the preferred embodiment of a path setting control system in a communication network according to the present invention. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 13A:
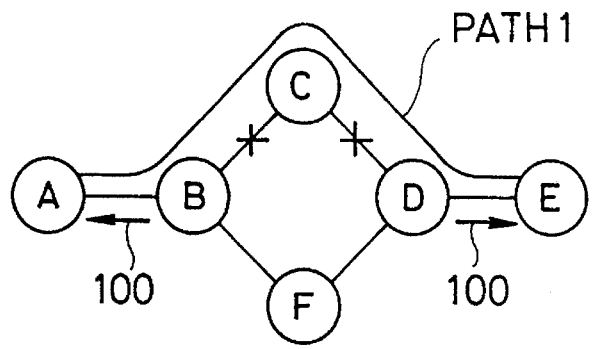
FIGS. 13(A) to 13(C) are illustration explaining principle of a path setting control system in the conventional distributed self-healing for faulty network recovery.
Figure 13B:
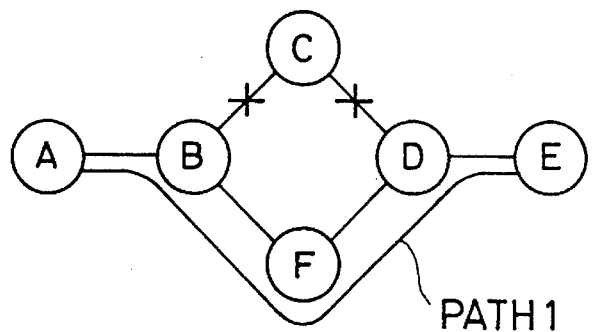
Figure 13C:
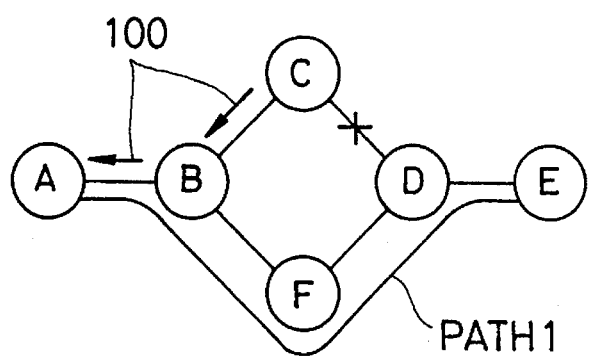

FIGS. 1(A) to 1(D) are block diagrams showing principle of the present invention and illustrating nodes A to F similarly to FIGS. 13(A) to 13(C). A path 1 represents a path established between the nodes A and E. The nodes A and E are terminal nodes and nodes B, C and D are relay nodes in the path 1.

Setting of the path 1 is performed by one of the terminal nodes A and E to be active as sender node. On addition to the path setting set forth above, the sender node also performs initiation of a path alternating process, version management of the path and so forth. Upon setting the path 1, a path ID and path version are notified to the relay nodes B, C and D from the sender node.

Figure 1A:
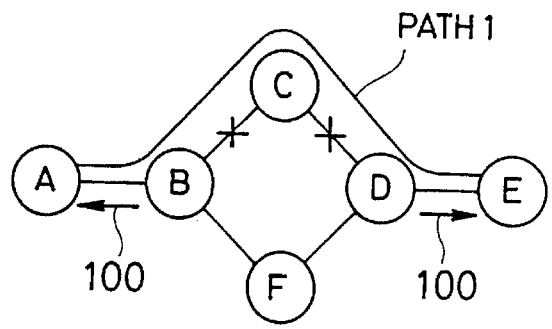
FIGS. 1(A) to 1(D) are illustration showing conceptual operation of the present invention.
Figure 1B:
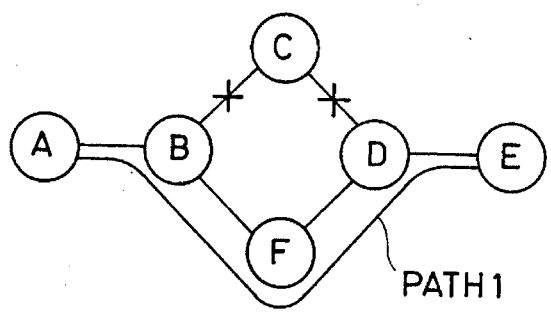

As shown in FIG. 1(A), when failure is caused at two portions, i.e. between nodes B and C and between nodes C and D, the nodes B, C and D notifies an alternation designating message 100 designating a path to be alternated to the terminal nodes A and E utilizing the path ID and the path version of the path 1. The terminal nodes A and E receiving the alternation designating message 100 recognize path to be alternated on the basis of the path ID and verifies that the version currently set in the own nodes is coincident with the version of the path 1. When consistency of the versions is confirmed, alternating operation is performed after varying the version. Through this process, the path 1 can be alternated to pass through the node F, as shown in FIG. 1(B).

Figure 1C:
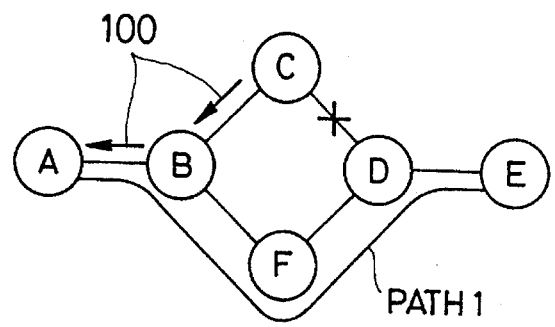
Figure 1D:
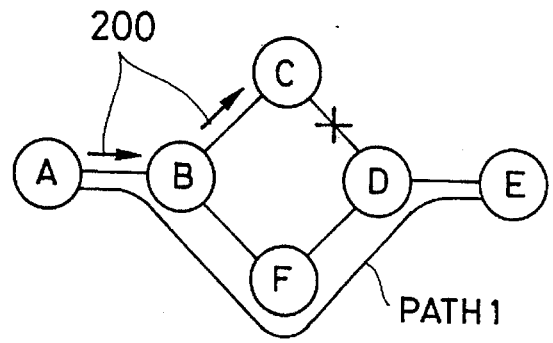

Next, when only failure between the nodes B and C is recovered after completion of alternation as shown in FIG. 1(C), since the setting of the path 1 is maintained in the node C, the node C issues the alternation designating message 100 to the node A for failure between the nodes C and D. The node A receiving such alternation designating message 100 recognizes the path to be alternated on the basis of the path ID. However, since the version is different from the version of the path 1 currently set in own node, alternating operation is not performed. On the other hand, as shown in FIG. 1(D), the node A transmits a release command 200 of the path 1 to the node C. The node C receiving the release command 200 releases the path 1.

As set forth above, even on the relay node which could not release the path since the path release message could not reach thereto for failure in a plurality of transmission lines, it becomes possible to release path after recovery of multi-line failure. Thus, transmission lines can be efficiently used.

Figure 2:
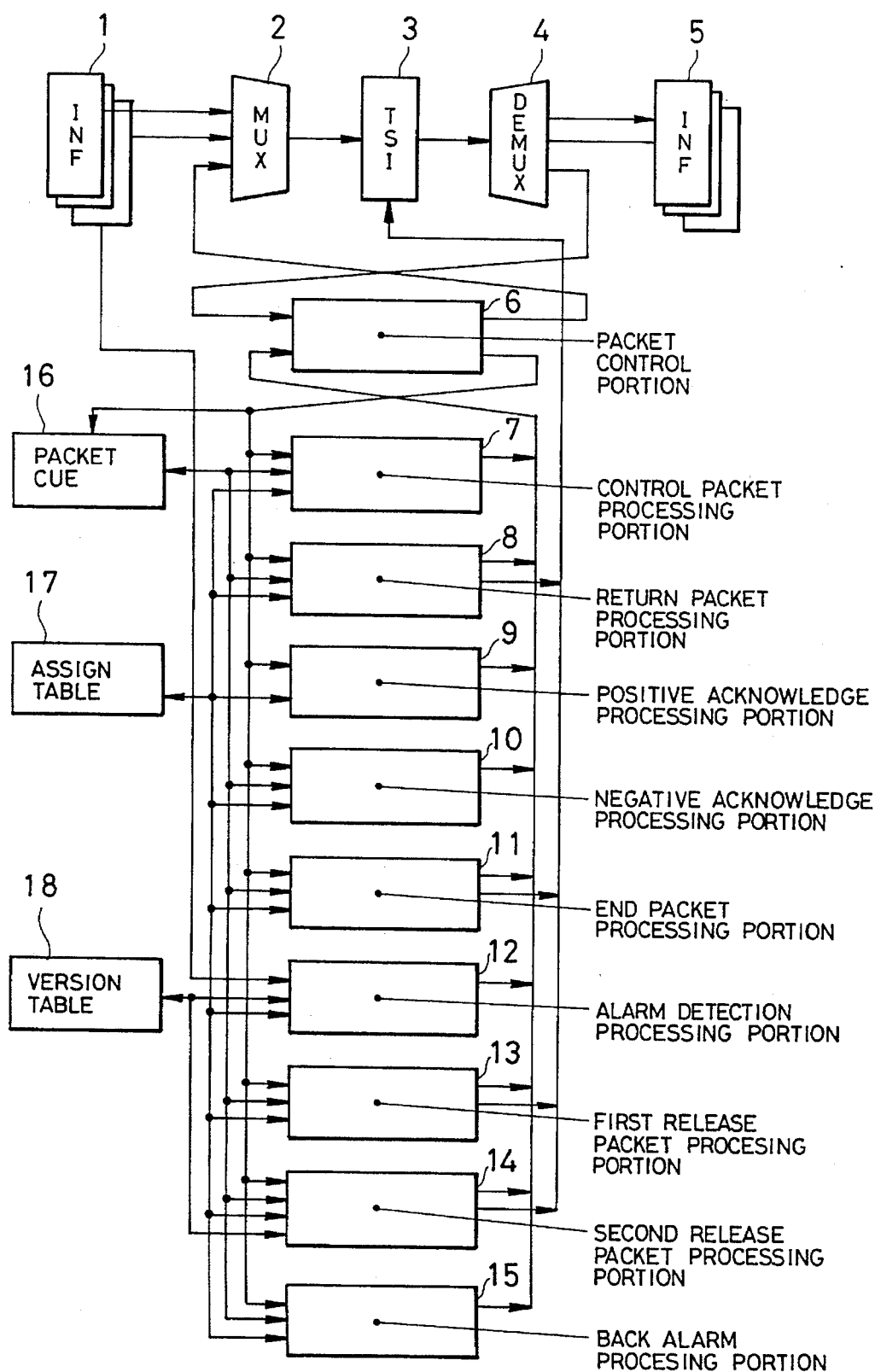
FIG. 2 is a block diagram of each node in the preferred embodiment of a path setting control system according to the present invention.

Next, the preferred embodiment of the path setting control system according to the present invention will be discussed in detail with reference to FIGS. 2 to 12. FIG. 2 is a block diagram showing function of each node in the preferred embodiment of the path setting control system. In FIG. 2, INF 1 and INF 5 denote external interface portion forming interface between transmission lines, terminals and so forth. MUX 2 denotes a multiplexing portion multiplexing packets from the interface portion 1 or an internal packet control portion 6. TSI 3 is a switch portion and DEMUX 4 is a demultiplexing portion which demultiplexes the multiplexed packets for introduction to the internal packet control portion 6 or the interface portion 5.

The internal packet control portion 6 performs control of processing portions 7 to 15 as respective function blocks. A control packet processing portion 7 performs process according to the operational process flowchart shown in FIG. 3 and performs path setting, path alternation process and so forth utilizing a control packet.

Figure 4:
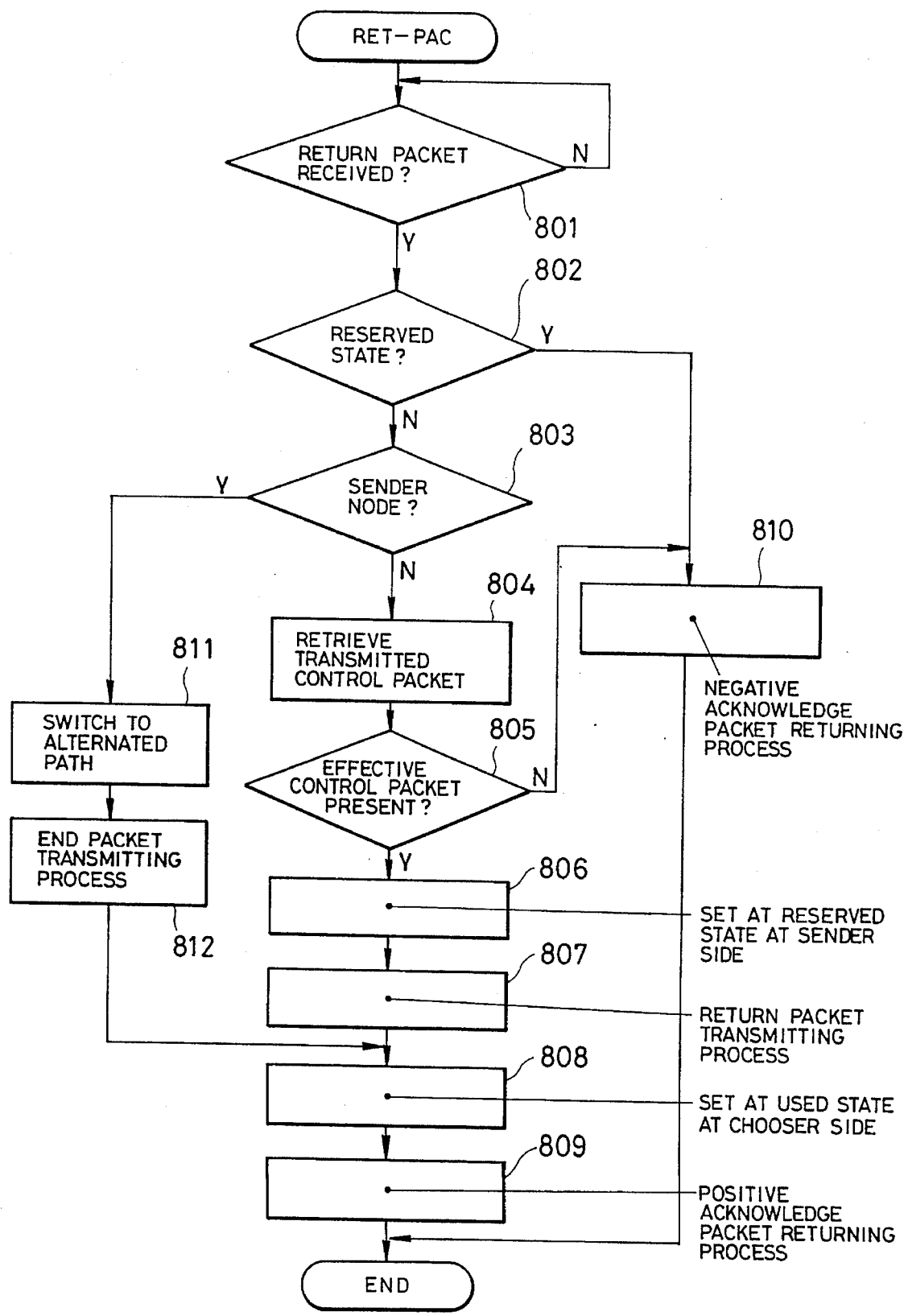
FIG. 4 is a flowchart showing operation of a return packet processing portion 8 of the block in FIG. 2.

A return packet processing portion 8 performs process according to the operational process flowchart shown in FIG. 4 for controlling a return packet returned from a chooser node (among terminal nodes of the path, the terminal node other than a sender node) receiving the control packet from the sender node.

Figure 5:
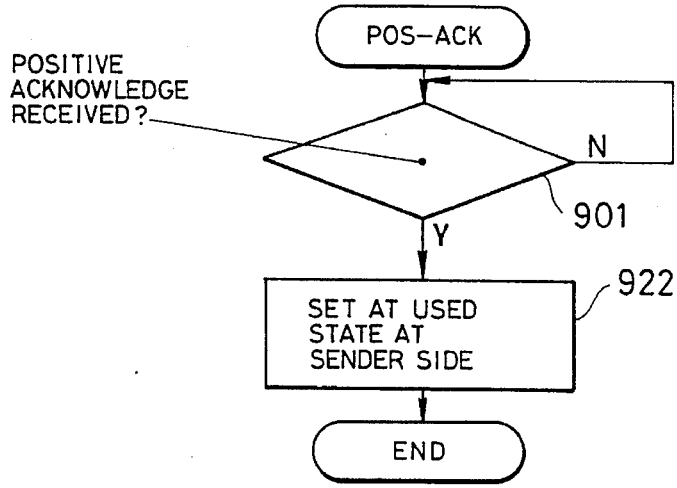
FIG. 5 is a flowchart showing operation of a positive acknowledge processing portion 9 of the block in FIG. 2.

A positive acknowledge processing portion 9 performs process according to the operational process flowchart shown in FIG. 5 for receiving the return packet, transmitting the return packet to the next transmission line and providing a receiving acknowledge (positive acknowledge) to the sender of the return packet.

Figure 6:
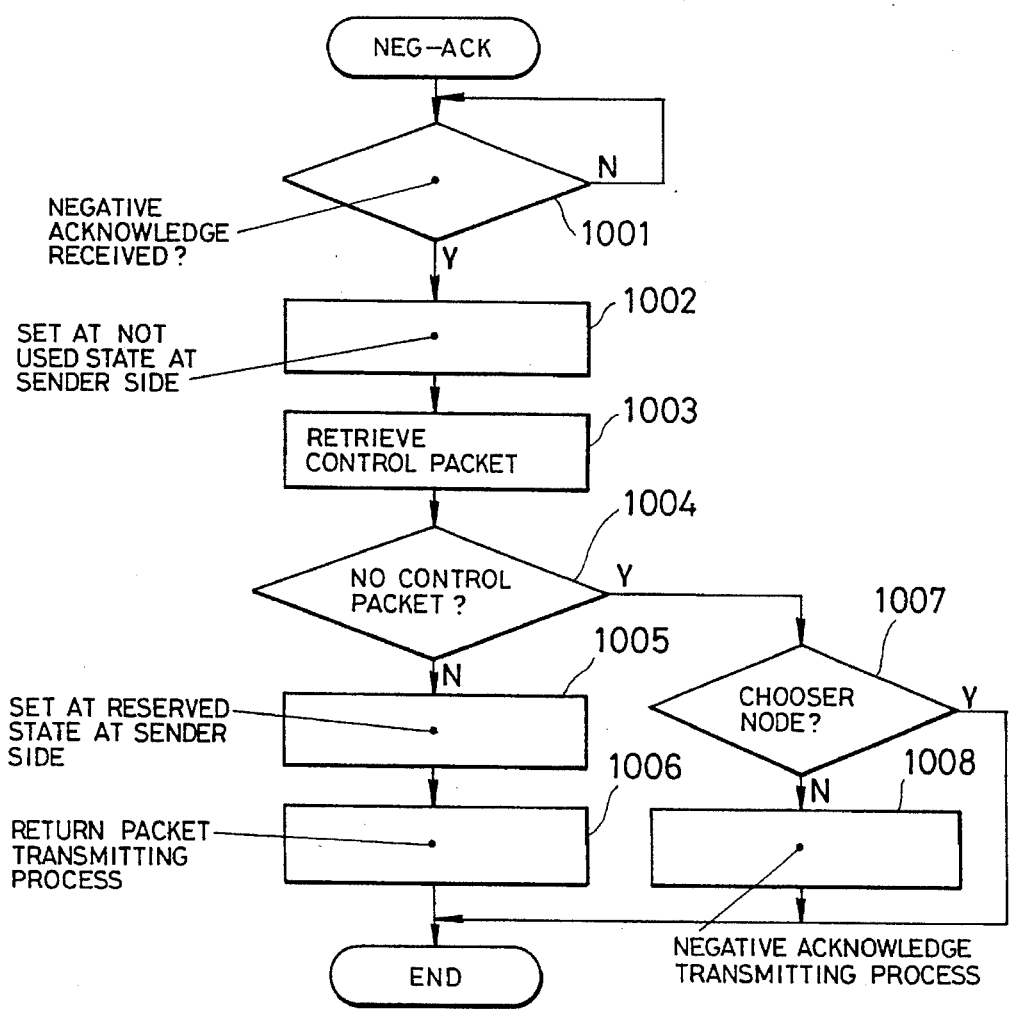
FIG. 6 is a flowchart showing operation of a negative acknowledge processing portion 10 of the block in FIG. 2.

A negative acknowledge processing portion 10 performs process according to the operational process flowchart shown in FIG. 6 for receiving the return packet and transmit return packet to the sender of the return packet through other transmission line (negative acknowledge), when there is no transmission line to transmit the return packet.

Figure 7:
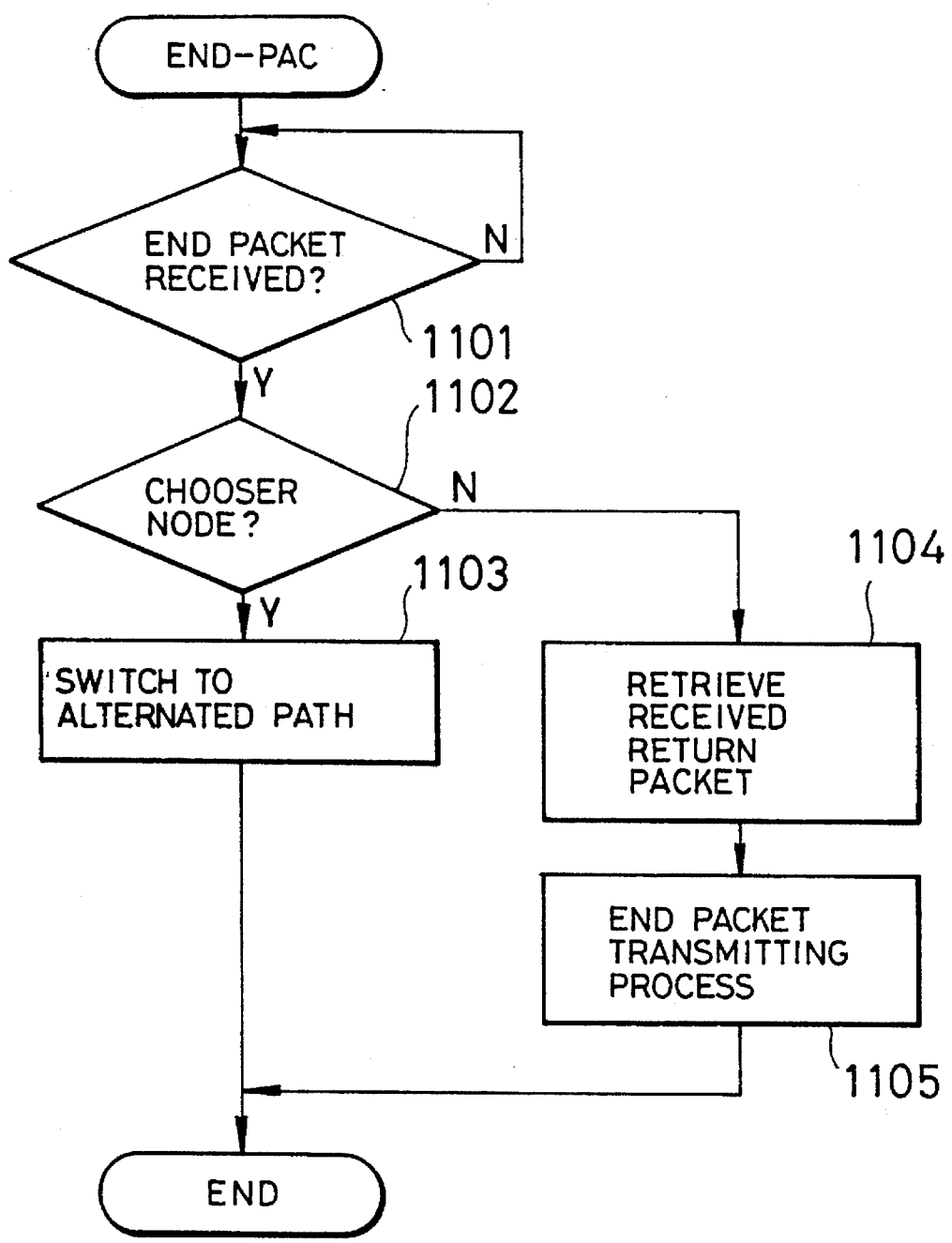
FIG. 7 is a flowchart showing operation of an end packet processing portion 11 of the block in FIG. 2.

An end packet processing portion 11 performs process according to the operational process flowchart shown in FIG. 7 for controlling packet transmitted toward the chooser node from the sender node for establishing the alternating path.

Figure 8:
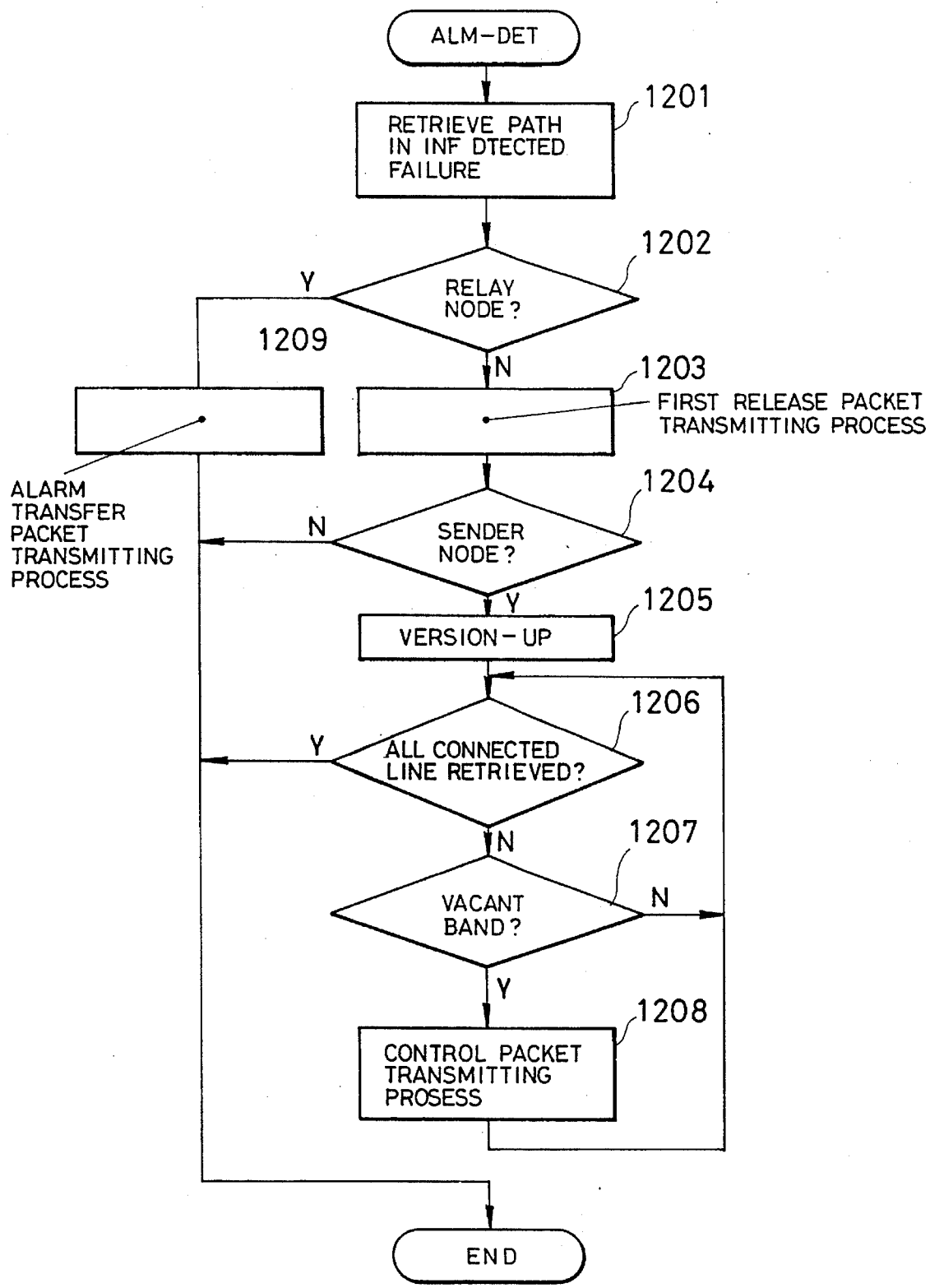
FIG. 8 is a flowchart showing operation of an alarm detection processing portion 12 of the block in FIG. 2.

An alarm detection processing portion 12 performs process according to the operational process flowchart shown in FIG. 8 for performing failure detection of the transmission lines connected to the own node and transmitting an alarm transfer packet and a first release packet for commanding releasing of path upon detection of failure.

Figure 9:
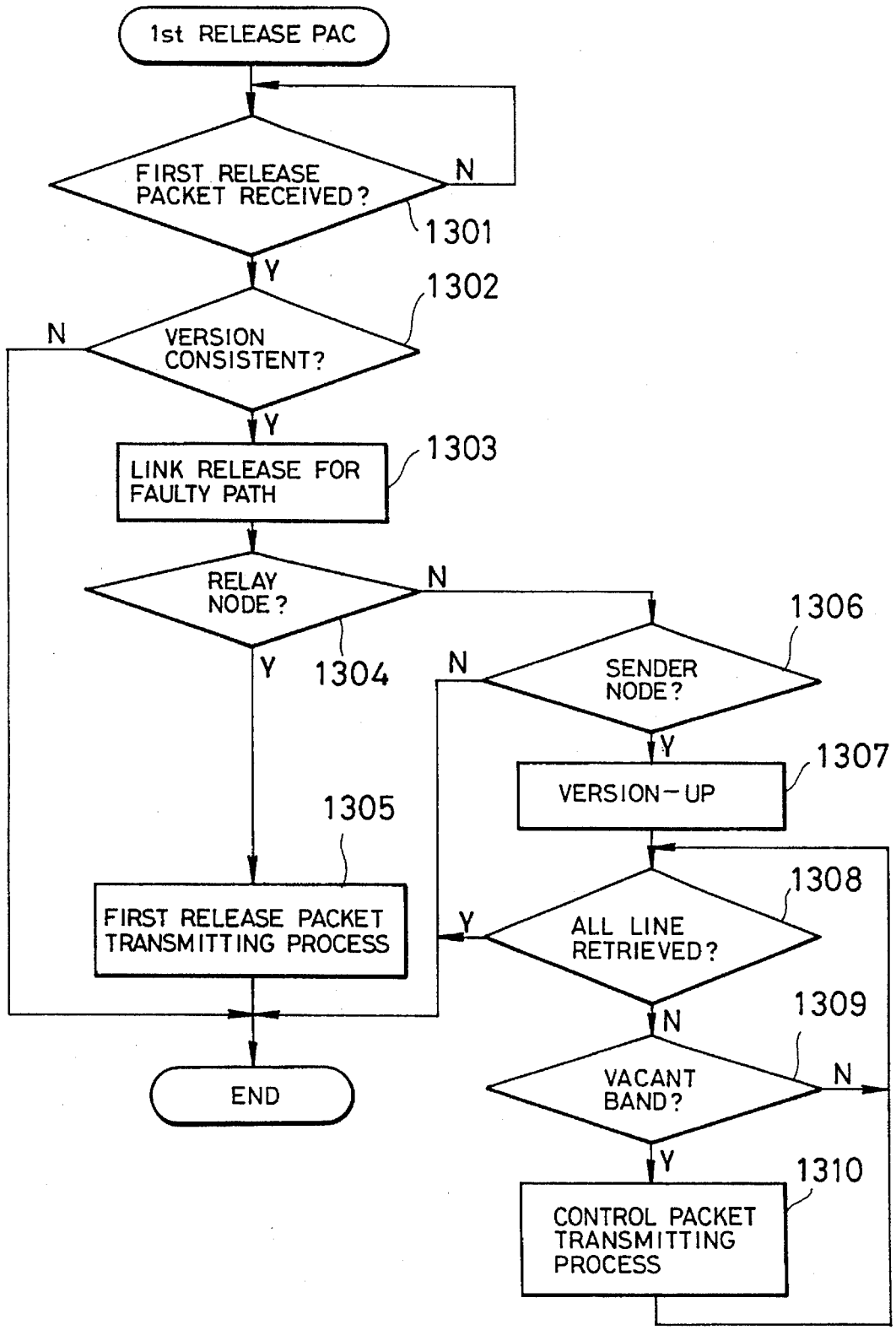
FIG. 9 is a flowchart showing operation of a first release packet processing portion 13 of the block in FIG. 2.
Figure 10:
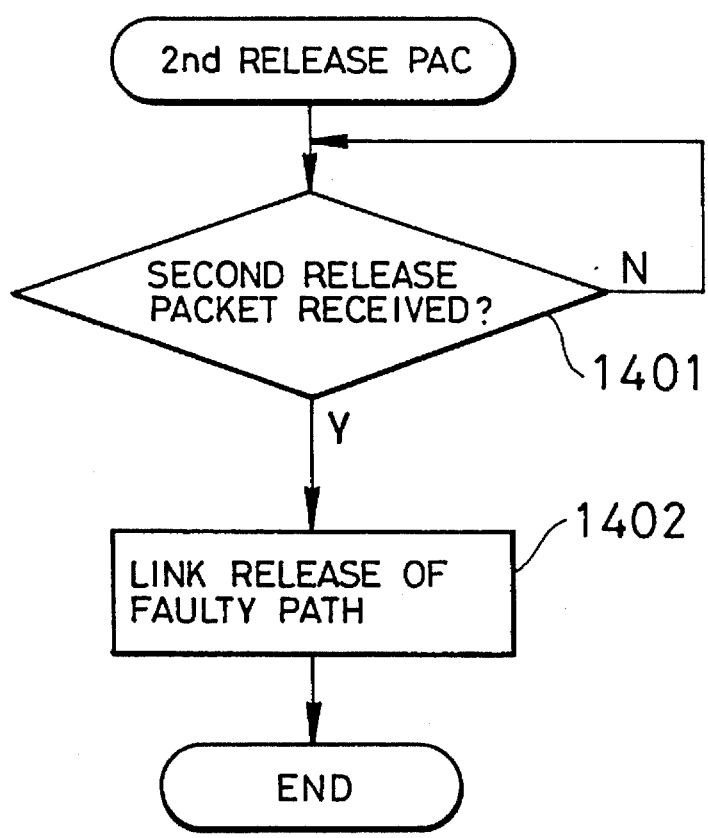
FIG. 10 is a flowchart showing operation of a second release packet processing portion 14 of the block in FIG. 2.

The first and second release packet processing portions 13 and 14 perform process according to the operational process flowcharts of FIGS. 9 and 10, respectively. The first release packet processing portion 13 performs path link releasing process after receiving the first release packet. The second release packet processing portion 14 performs path releasing process after receiving a second release packet from a back alarm processing portion 15.

Figure 11:
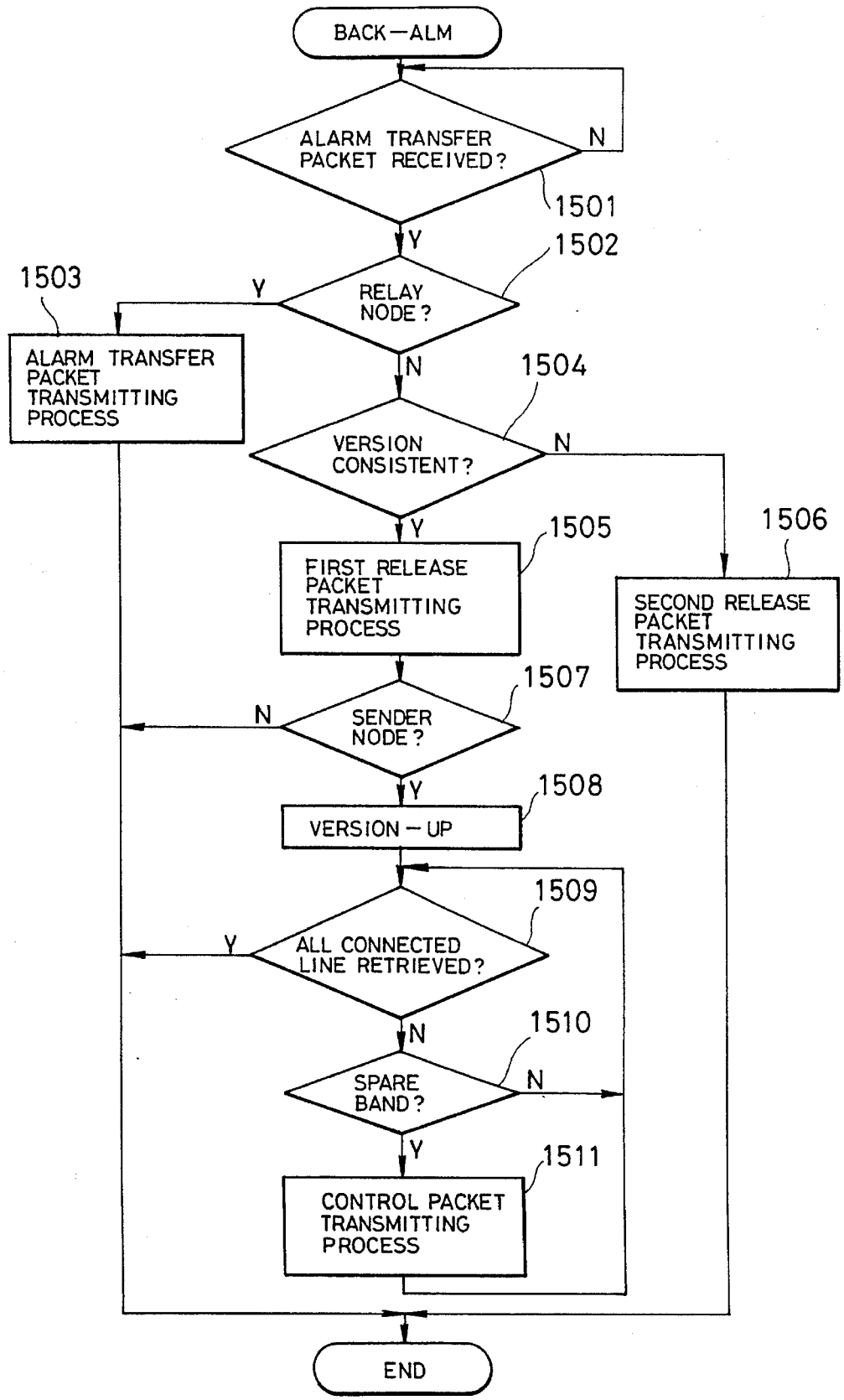
FIG. 11 is a flowchart showing operation of a back alarm processing portion 15 of the block in FIG. 2.

The back alarm processing portion 15 performs operation according to the operational process flowchart shown in FIG. 11 to perform transmission process of the first and second path releasing packet receiving the alarm transfer packet and relaying process of the alarm transfer packet.

A packet cue 16 is a reception packet sequence. An assign table 17 is a table managing use condition (use, non-use, reserve) of respective band of the connected transmission line. A version table 18 is a table managing version of the path.

Figure 3:
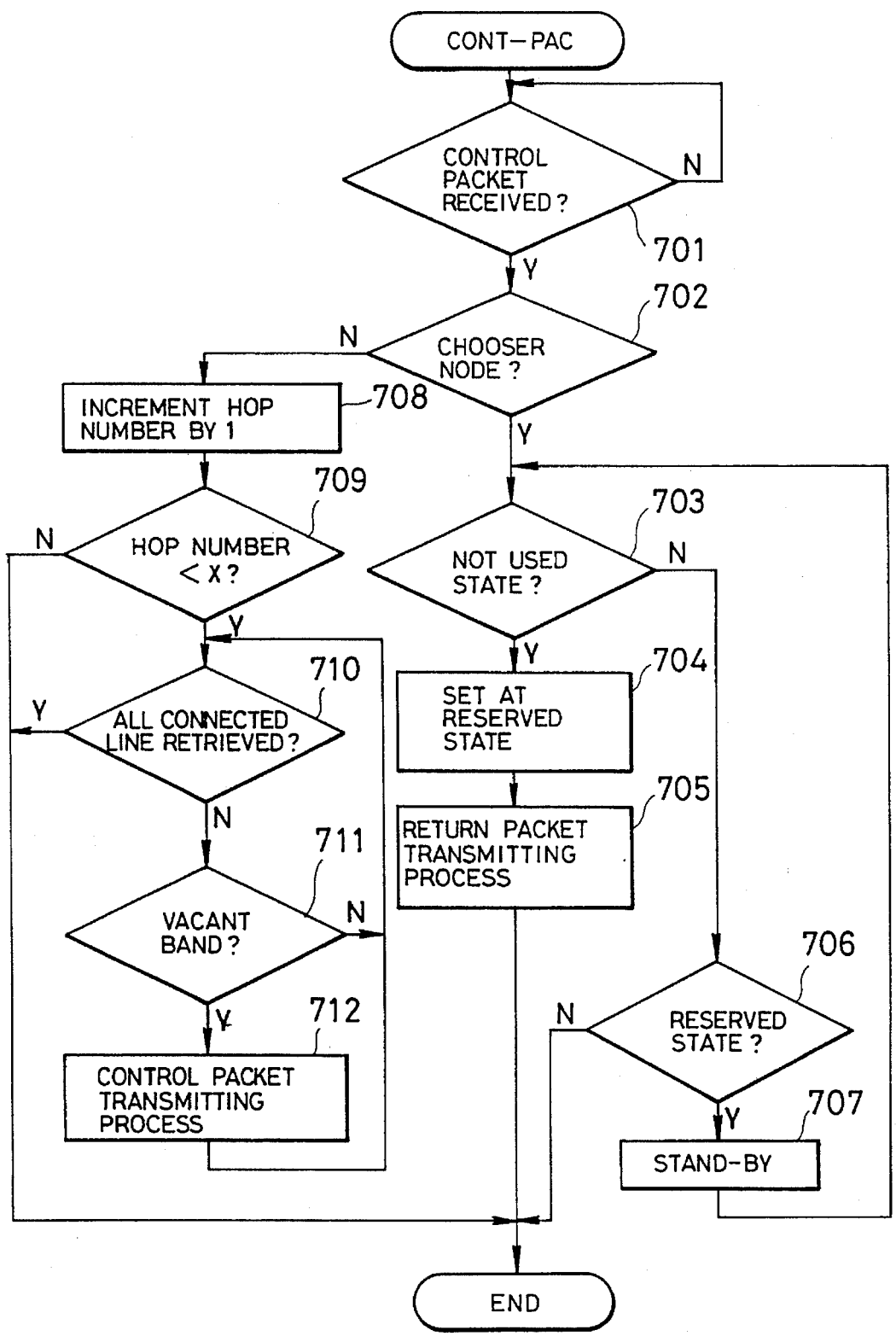
FIG. 3 is a flowchart showing operation of a control packet processing portion 7 of the block in FIG. 2.

The operations of respective processing blocks will be discussed hereinafter in detail. FIG. 3 shows the operation of the control packet processing portion 7. Here, the control packet is a packet to be transmitted from the sender node to the chooser node for retrieving alternating line of the path and transmitted to all of lines having vacant band necessary for setting the path in broadcasting manner. On the other hand, the control packet has a predetermined hop number so that it may not be maintained within the network for a long period. Therefore, when the hop number becomes greater than or equal to a predetermined value (X), the control packet is disposed.

Referring to FIG. 3, when the control packet is received (701), and when the own node is the chooser node (702), the state (used or not used) of the band designated by the control packet is checked by the assign table 17 (703). If not used, the state of the designated band is set as reserved (704). Then, a return packet transmitting process is performed (705).

When the state of the designated band is not the "not used" and is reserved (706), the node is placed in stand-by state (707). If not reserved, the node is in the used state. Thus, the process is terminated.

When the own node as checked at the step 702 is other than the chooser node, the hop number of the control packet is incremented by "+1" (708). When the hop number is greater than X, the control packet is disposed as set forth above, and the process is terminated (709). On the other hand, when the hop number is small as checked at the step 709, check is performed whether all of the connected transmission lines are inspected (710). If not, check is performed whether a vacant band higher than the band of the faulty path (path 1 in FIG. 1) (711). When the vacant band is present, the control packet is transmitted the transmission line having the vacant line (712). Otherwise, the processes at the steps 710 and 711 are performed to retrieve the transmission line.

FIG. 4 shows the operation of the return packet processing portion 8. Here, the return packet is the packet to be transmitted from the chooser node to the sender node for reserving alternating lines. The return packet is transmitted to the transmission line which receives the control packet at earliest timing among a plurality of control packets received by the chooser node and relay nodes. It should be noted that when the negative acknowledge is received from the transmission line which receives the control packet at the earliest timing, the return packet is transmitted to the transmission line receiving the control packet at next earliest timing.

Referring to FIG. 4, when the return packet is received (801), check is performed whether the state of the designated band is reserved or not with the assign table 17 (802). If reserved, negative acknowledge packet return process is performed (810). On the other hand, if not reserved, check is performed whether the own node is the sender node or not (803).

If the own node is the sender node, the route of the faulty path is switched to the alternating line (step 811). Then, the end packet transmission process is performed (812). If not the sender, the control packets transmitted from own node are retrieved (804). If there is no effective control packet, the process goes to the step 810. On the other hand, if effective control packet is present, the state of the band at the sender side is set at reserved state (806).

Then, the return packet is transmitted (807), the state of the band at the chooser side is set as used (808). Then, the positive acknowledge packet is returned (809).

FIG. 5 is an operational flowchart of the positive acknowledge processing portion 9. When the positive acknowledge packet is received (901), the state of the band at the sender side is set as used (922).

FIG. 6 is an operational flowchart of the negative acknowledge processing portion 10. When the negative acknowledge packet is received (1001), the state of the band at the sender side is set as not used (1002). Then, the control packet is retrieved (1003). If there is no control packet which is not yet tried (1004), check is performed whether the own node is chooser or not (1007). If not the chooser, the negative acknowledge transmission process is performed (1008).

If the control packet is present as checked at the step 1004, the state of the band at the sender side is set as reserved (1005). Then, the return packet is transmitted (1006).

FIG. 7 is the operational flowchart of the end packet processing portion 11. Here, the end packet is a packet to be transmitted from the sender node to the chooser node for determining the alternating path.

Referring to FIG. 7, when the end packet is received (1101), check is performed whether the own node is the chooser node (1102). If the chooser node, the route of the faulty band is switched to the alternating line (1103). If not the chooser node, the received return packet is retrieved (1104) and the end packet is transmitted (1105).

FIG. 8 is an operational flowchart of an alarm detection processing portion 12. A path contained in the interface portion detecting failure is retrieved (1201). Then, check is performed whether the own node is the relay node or not (1202). If the relay node, alarm transfer packet is transmitted (1209). Otherwise, the first release packet is transmitted (1203).

The first release packet is a packet to be transmitted from the sender node to the chooser node or from the chooser node to the sender node for designating release of path assignment. The difference of the first release packet from the second release packet discussed later, is that the first release packet is transmitted along the path from one of the terminal nodes to the other terminal node. Each relay node receiving the first release packet releases assignment of ling of the path and then transmit the first release packet to the next node.

Then, if the own node is the sender node (1204), version-up of the path is performed (1205), and retrieval of all connected transmission lines is performed (1206). Then, check is performed whether a vacant band higher than or equal to the band of the faulty path is present in the transmission lines (1207). If the vacant band is present, the control packet is transmitted (1208).

FIG. 9 shows the operation of the first release packet processing portion 13. When the first release packet is received (1301), consistency of the version of path is checked (1302). If consistent, release of the link of the faulty path is performed (1303). If the own node is the relay node (1304), the first release packet is transmitted to the connected next node (1305).

If not the relay node (1304), check is performed whether the own node is the sender node (1306). If the sender node, version-up of the path is performed (1307), check is performed whether vacant band higher than or equal to the band of the faulty path with respect to all of the connected transmission lines (1308, 1309). If vacant band is present, control packet is transmitted (1310).

FIG. 10 shows operation of the second release packet processing portion 14. The second release packet is a packet to be transmitted for commanding release of link connection of the path in the relay node with respect to the relay node of the sender of the alarm transmission packet by the sender node or chooser node receiving the alarm transmission packet, when the version of the path designated by the alarm transmission packet is different from the version of the path currently connected.

The difference of the second release packet to first release packet is that the second release packet commands release of link assignment only to the relay node which transmitted the alarm transfer packet.

Referring to FIG. 10, when the second release packet is received (1401), a process for releasing link of the faulty path (1402) is performed.

FIG. 11 shows the operation of the back alarm process portion 15. When the alarm transfer packet is received (1501), check is performed whether the own node is the relay node (1502).

Here, the alarm transfer packet is a packet transmitted from the relay node to the sender node or the chooser node. When failure is caused in the zone which cannot be detected directly by the both terminal nodes, the alarm transfer packet is transmitted for promoting path alternation by both relay nodes at both ends of the faulty zone.

FIG. 11 shows the operation of the back alarm processing portion 15. When the alarm transfer packet is received (1501), and if the own node is the relay node (1502), the alarm transfer packet is transmitted to the connected next node (1503). Otherwise, version of the path is checked (1504). If the version of the path is not consistent, the second release packet transmission process is performed (1506). If consistent, the first release packet transmission process is performed (1505).

If the own node is the sender node (1507), version of the path is incremented by "+1" (1508). Thereafter, check is performed whether an extra band higher than or equal to the band of the faulty path is present or not with respect to all of the connected transmission lines (1509, 1511). If the extra band presents, the control packet is transmitted (1511).

FIG. 12 shows the path alternating process and the path releasing process shown in FIGS. 1(A) to 1(D) in a form of a sequence chart and is a timing chart showing the operation of the shown embodiment of the path setting control system according to the present invention.

When multi-line failure is caused in the path 1 as shown in FIG. 1(A), the alarm transfer packets 100 are generated by the alarm detection processing portion 12 of the nodes B and D connected to the both ends of the faulty transmission line. The alarm transfer packets are then transmitted to the nodes A and E, respectively (step 1209). In the nodes A and E, the first release packets are transmitted by alarm detection processing portion (step 1203). In the sender node (A), the version of the path is incremented by "+1" (step 1205), and then, the control packet is transmitted to the transmission line in the vacant band (steps 1207, 1208).

Each of the nodes B and D receiving the first release packet checks consistency of the version of the path by the first release packet processing portion 13 (step 1302) and performs release of the link of the faulty path (step 1303).

On the other hand, the node B receiving the control packet increments the hop number of the control packet by "+1" in the control packet processing portion 7 (step 708) and transmits the control packet to the connected transmission line having vacant band (step 712). Next, nodes F and D also perform the similar process for the control packet in the control packet processing portions 7 (step 712). In the chooser node E, transmission of the return packet is performed (step 705).

The nodes D, F and B sequential transmit the return packet with setting the state if the band at the sender side at the reserved state by respective return packet processing portions 8. In the sender node A, the route of the faulty path is switched to the alternated line (step 811) and the end packet is transmitted (step 812). It should be noted that at each node D, F, B, A, the positive acknowledge packet is returned by the return packet processing portion 8 (step 809).

Each node B, F, D, E receiving the positive acknowledge packet sets the band at the sender side of the assign table 17 at used state by the positive acknowledge processing portion 9 (step 922).

The node B receiving the end packet from the sender node A transmits the end packet to the next node F by the end packet processing portion 11. Then, the end packet is transmitted from the node F to the next node D, and then from the node D to the next not E, respectively (step 1105). Since the node E is the chooser node, alternated path is completed by switching the route of the faulty path to the alternated line (step 1103). This is the state illustrated in FIG. 1(B).

As shown in FIG. 1(C), if failure of the transmission line between the nodes B and C is recovered, the alarm detecting portion 12 of the node C transmits the alarm transfer packet 100 for presence of failure of the transmission line between the nodes C and D (step 1209). The back alarm processing portion 15 of the sender node A receives the alarm transfer packet via the node B and checks the version (step 1504). Since the version is not consistent, the second release packet 200 is transmitted (step 1506). The node C receiving the second release packet b releases the assignment of the path 1 (step 1402).

As set forth above, according to the present invention, even at the relay node where the path release message cannot be reached upon alternation of the path, due to multi-line failure, and thus cannot be released the path assignment, releasing of path can be done after recovery of multi-line failure. Therefore, the released transmission line can be effectively used.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A path setting control system in a communication network including terminal nodes located at ends of a path for data transmission, and a plurality of relay nodes located at intermediate positions in said path, and performing alteration process of the path at the occurrence of simultaneous failure in transmission lines at both sides of one relay node among said plurality of relay nodes, said path setting control system comprising:

path alternation designating means included in a closest one of said plurality of relay nodes which is located at the closest position to said one relay node, for commanding alternation of said path to one of said terminal nodes in response to said failure; and path releasing and alternating means incorporated in said one of said terminal nodes, for performing path releasing process and alternating process in response to said alternation command; and path release designating means incorporated in said one of said terminal nodes, for commanding release of a currently set path for said one relay node in response to an alternation command for the path transmitted from said one relay node due to said failure of one of said transmission lines upon recovery of said failure in another one of said transmission lines.

2. A path setting control system as set forth in claim 1, wherein said one relay node has a path release means for performing path releasing process in response to said path release command from said one of said terminal nodes.

3. A path setting control system as set forth in claim 2, wherein said one of said terminal nodes has path version managing means for managing path version for distinguishing said path before alteration and after alternation, and said path releasing and alternating means includes process judgement means for performing alternating process of said path according to path version and path releasing command transmission process.

4. A path setting control system as set forth in claim 3, wherein said path version managing means updates path version before alternation of the path after path alternating process, said process judgement means responsive to said path alternation command, checks consistency of path version provided for said command and path version after updating, performs path alternation process if consistent and performs path releasing command transmission process otherwise.

5. A path setting control system as set forth in claim 4, wherein said network is a communication network transmitting a user data, and path alternation commanding and path releasing commanding are performed by a commanding packet.

6. A path setting control system as set forth in claim 5, wherein said commanding packet contains a path identifying information for identifying a transmission path of the packet and a path version information.

7. A path setting control system in a communication network, including:

terminal nodes located at both ends of a path for data transmission, and relay nodes located at intermediate positions in said path, each relay node having at least two transmission lines, one of said transmission lines being on a first side of said each relay node, and another of said transmission lines being on a second side of said each relay node;

wherein said relay nodes perform a path alternation process to produce a path alternation command at the occurrence of simultaneous failure in said one and said another of said transmission lines of one of said relay nodes;

wherein one of said terminal nodes performs a path release command transmitting process to produce a path release command in response to said path alternation command; and wherein said path alternation command is transmitted from said one of said relay nodes in response to said simultaneous failure, and is transmitted upon recovery of said one of said transmission lines.

8. A path setting control system as set forth in claim 7, wherein said one of said terminal nodes includes:

management means for managing a path version for distinguishing the path before alternation and the path after alternation, and process judgement means for checking said path alternation process and said path release command transmitting process based on the path version.

9. A path setting control system as set forth in claim 8, wherein:

said managing means updates said path version of said path before and after said path alternation process is performed, and said process judgement means checks, for consistency, (1) said path version added to said alternation command after path alternation process and (2) said path version after updating, and performs said path alternation process, if consistent, and performs said path release command transmission process otherwise.

10. A path setting control system as set forth in claim 9, wherein said one of said relay nodes performs a path releasing process in response to said path release command.

11. A path setting control system as set forth in claim 10, wherein:

said network is a communication network transmitting packet data, said path alteration command and said path release command are transmitted by a commanding packet, and said commanding packet contains a path identifying information for identifying the transmission path of the packet and said path version information.

* * * * *